(12) United States Patent
Hancock et al.

(10) Patent No.: US 7,000,498 B2
(45) Date of Patent: *Feb. 21, 2006

(54) ADJUSTABLE UNIVERSAL OPERATING LEVER EXTENSION

(75) Inventors: Dennis Hancock, Mountain Green, UT (US); Jeffrey D Hancock, Uintah, UT (US)

(73) Assignee: Stearns Inc., Sauk Rapids, MN (US)

( * ) Notice: Subject to any disclaimer, the term of this patent is extended or adjusted under 35 U.S.C. 154(b) by 183 days.

This patent is subject to a terminal disclaimer.

(21) Appl. No.: 10/379,501

(22) Filed: Mar. 5, 2003

(65) Prior Publication Data

US 2004/0173045 A1    Sep. 9, 2004

(51) Int. Cl.
G05G 1/00 (2006.01)
B62K 21/12 (2006.01)

(52) U.S. Cl. .................. 74/544; 74/551.8; 74/488; 74/489; 74/551.9; 74/558

(58) Field of Classification Search ........... 744/544, 744/543, 551.3, 551.8; 16/421; 403/373, 403/374.2, 374.3
See application file for complete search history.

(56) References Cited

U.S. PATENT DOCUMENTS

| | | |
|---|---|---|
| 3,760,648 A | 9/1973 | Hoffman |
| 3,937,629 A | 2/1976 | Hamasaka |
| 4,077,236 A | 3/1978 | Dalziel |
| 4,794,815 A | 1/1989 | Borromeo |
| 4,838,113 A * | 6/1989 | Matsushima et al. ...... 74/551.8 |
| 4,862,762 A | 9/1989 | Ross |
| D316,989 S | 5/1991 | Giambrone |
| 5,078,023 A | 1/1992 | Scarborough |
| D330,000 S | 10/1992 | DeMuro, Jr. |
| 5,299,466 A * | 4/1994 | Heilbron et al. ........... 74/502.2 |
| 5,315,895 A | 5/1994 | Kattus et al. |
| 5,347,835 A * | 9/1994 | Dewey ......................... 70/202 |
| 5,647,248 A * | 7/1997 | Silsby, Jr. .................. 74/558.5 |
| 5,683,201 A | 11/1997 | Guaron |
| 5,758,364 A | 6/1998 | Rewoldt |
| 5,775,167 A | 7/1998 | Maietta |
| 5,868,515 A | 2/1999 | Janssen |
| 6,003,405 A | 12/1999 | Giard |
| 6,135,667 A | 10/2000 | Debisschop |
| 6,167,776 B1 * | 1/2001 | Cossette ...................... 74/488 |
| D446,488 S | 8/2001 | Hancock et al. |
| 6,360,628 B1 * | 3/2002 | Corso ........................ 74/502.2 |

(Continued)

FOREIGN PATENT DOCUMENTS

DE    3340893    5/1984

OTHER PUBLICATIONS

CRC Handbook of tables for Applied Engineering Science, 2nd Edition, CRC Press, 1976, pp. 117-121.*

(Continued)

Primary Examiner—Vinh T. Luong
(74) Attorney, Agent, or Firm—Merchant & Gould P.C.

(57) ABSTRACT

An adjustable extension lever to be attached to a control lever of a vehicle such as an all-terrain vehicle, snowmobile, motorcycle or personal watercraft to extend the lever surface available to be contacted during control of the vehicle and including a bendable lever extension that will bend under a bending force greater than the operating force required to operate the vehicle control lever to insure a comfortably located thumb and/or palm engagement surface on an extender connected to and pivot able with the control lever.

4 Claims, 3 Drawing Sheets

U.S. PATENT DOCUMENTS

| | | | |
|---|---|---|---|
| 6,494,113 B1 * | 12/2002 | Hancock et al. | 74/544 |
| 6,658,965 B1 * | 12/2003 | Allen | 74/526 |
| D499,052 S * | 11/2004 | Gates | D12/174 |
| 2005/0035163 A1 * | 2/2005 | French et al. | 224/243 |

OTHER PUBLICATIONS www.sportsmagazine.com/cb/cb.asp?a=145597; All Rite® Thumbuddy ATV Throttle Extender; dated Nov. 22, 2004; 1 page.

www.psep.biz/store/atv_thumb_saver.htm; Cajun CDS Thumb Saver 2; dated Nov. 22, 2004; 1 page.

www.mtatires.com, CDS Adustable Thumb Saver Page; dated Nov. 22, 2004, 1 page.

"Shop Online at Temecula Motorsports. Search for Lever," *Temecula Motorsports*, http://www.temeculamotorsports.com/catalog_keyword_search.asp?sid= 05603601X10K . . . , 4 pages (Copyright 2004).

* cited by examiner

ADJUSTABLE UNIVERSAL OPERATING LEVER EXTENSION

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to operating levers for vehicles and is particularly concerned with such levers as are commonly used in the control of a vehicle throttle setting, vehicle brake control and/or vehicle clutching operations.

More particularly, the invention is related to lever extensions employed to extend the length of existing levers and/or to make actuation of such levers and the particularly the holding of such levers for an extended period of time, more comfortable for a user.

While generally making it easier for an operator to manipulate control levers extensions do not provide the same degree of comfort for all users. The size of a user's hand and the reach of the user's fingers and thumbs varies from user to user.

2. Description of the Related Art

It has been recognized in the past that thumb operated throttle control levers commonly used on all-terrain vehicles, snowmobiles, personal water-craft and many other vehicles are often difficult to hold in a set position since the user's thumb may tire and release the throttle lever. This is particularly true when the throttle lever is being held for slow vehicle travel and when the pivoting end of the lever is at its greatest distance from a handgrip being grasped by the vehicle user, thus requiring maximum stretch by the user's hand to hold the control lever in position.

Even if the user is not holding the throttle lever for slow vehicle travel the hand stretch required to hold the lever in an open throttle position may be very tiring, particularly for persons having small hands. A user of a vehicle equipped with brake control levers or clutch control levers and having small hands may also find it difficult to operate the brakes or clutch of the vehicle.

In U.S. Pat. No. 5,078,023 it is recognized that the thumb of a user of a vehicle equipped with a conventional throttle lever will often tire when the lever is actuated, particularly at low throttle settings when a wide spread between hand and thumb is required. The patent discloses use of primary and secondary pivoted levers to reduce the thumb pressure required as the throttle is opened and held during vehicle travel.

U.S. Pat. No. 5,758,364 also recognizes that a user's hand may tire when actuating the throttle lever of a snowmobile. The patent discloses a glove to be worn by the user of the vehicle and having a strap extending between the forefinger and the thumb of the glove. The strap engages the throttle lever such that as the user's gloved hand grasps and rotates on the handgrip of a snowmobile the strap engages and actuates the throttle lever.

U.S. Pat. No. 5,775,167 discloses use of a finger operated control lever for snowmobiles and other vehicles, which is a secondary acceleration device to the primary thumb operated throttle control lever of the vehicle. When the operator's thumb becomes tired, the finger throttle is used to continue riding while resting the thumb.

U.S. Pat. No. 6,494,113 discloses an extension attachment that can be used with the operating levers of a great many different types and models of vehicles having thumb, finger and hand operated control levers. When used, the extension lever may decrease the travel distance required for lever movement during control operations and allows a user to operate the control lever with the palm of the hand, after initiating pull on the extension lever with the thumb, rather than relying on a spread thumb for continued control lever operation.

The extension lever is made of durable materials and is molded to have a hand engaging extender and hinged attachment plates with individual segments to facilitate securement of the extender as a continuation of the control lever to which the extension lever is attached. A shoulder provided on at least one attachment plate extends beneath control lever structure to prevent turning of the extension lever relative to the control lever.

BRIEF SUMMARY OF THE INVENTION

The present invention, like that disclosed in U.S. Pat. No. 6,914,113, is a lever that substantially universally adaptable for use on all-terrain vehicles, snowmobiles, watercraft and motorcycles and the like. The lever of the present invention further provides means for shaping of the handle projection of the lever to make the handle projection adjustable to better accomodate the reach of each particular user's fingers and thumbs.

OBJECTS OF THE INVENTION

Principal objects of the present invention are to provide an extension lever that is easily and securely attached to existing control levers mounted to handlebars of a variety of types and models of vehicles and that is shaprf to individual needs to facilitate easier handling and operation of the control levers. More specifically, it is an object of the invention to provide a lever to be used in the control of a vehicle, for example, an all-terrain vehicle, a snowmobile a motorcycle or a personal water craft, and to greatly reduce fatigue of the thumbs, fingers and hands of a user of the vehicle.

Other objects are to provide an extension lever that is durable, economically produced and that can be manipulated either by use of a thumb or by a portion of a user's palm while the user's hand is gripping a handlebar of the vehicle.

Still another object is to provide an extension lever that is shaped by a user to make it individually comfortable to use and that is easy to install on a vehicle.

FEATURES OF THE INVENTION

Principal features of the extension lever of the invention include a handle or engaging extender with a bendable metal core projecting from a pocket in a soft handle cover that attaches to a first one of a pair of attachment plates. The attachment plates have a pair of spaced apart 'living hinges' between them.

A second one of the pair of attachment plates has segments separated by slots extending from an edge of the attachment plate, through a thickened portion of the second attachment plate and into a thinner portion of the second attachment plate and towards the living hinges. The living hinges are formed in an even thinner portion that connects the attachment plates. A shoulder formed on the thickened portion of the second attachment plate will engage structure of a vehicle control lever to prevent turning of the extension lever with respect to an existing vehicle control lever.

A lever core is made of metal and will bend under pressure that is considerably greater than pressure applied to the lever handle during operation of a vehicle on which the lever is secured. The core will retain the shape to which it is bent under the greater pressure until being re-bent to a desired shape using such greater pressure. The core will not bend under the pressure applied by a user during operation of a motor vehicle. Preferably the extension lever components, other than the metal core, are molded of a very durable nylon material, or the like, that is softer than the metal core. An extender portion of the core fits into a pocket formed in an extender handle with a soft outer surface.

The first and second attachment plates are made sufficiently thick to remain rigid during installation and use on a vehicle. The core extends from a pocket of the extender and the extender, with core in place is fitted to a side of one attachment plate. Holes through the one attachment plate and the metal core correspond to holes through the second attachment plate. The holes through the first attachment plate are also counter-bored so that locking nuts to be threaded onto the bolts extending through the second attachment plate and through the first attachment plate during installation are recessed into the first attachment plate.

The metal core extends into a pocket of the extender portion which is formed from a suitable rubber material to provide an extender portion having a soft cover that is comfortable to the thumb, fingers and hand of a user. A hand engaging face of the extender portion has a rough textured portion to prevent slippage of a thumb or finger during use of the lever extension.

With the slots between adjacent segments of the second attachment plate extending through the thickest portion of the second attachment plate and into a thinner portion of the second attachment plate the segments are somewhat flexible. As the extension lever is positioned for securement to a control lever of a vehicle, the living hinges are bent to position the attachment plates at opposite sides of the control lever to which the extension lever is to be connected. The bolts through the segments of the second attachment plate are directed through the holes of the first attachment plate and are threaded into the nuts provided in the second attachment plate. Tightening of the nuts onto the bolts securely clamps the control lever between the attachment plates and positions the shoulder formed by the thickest portion of the second attachment plate to move beneath structure of the control lever. During such clamping the segments flex to allow the attachment plates and shoulder to conform to the shape of the control lever and insure clamping even on control levers of varying shapes.

Other objects and features of the invention will become apparent to those skilled in the art to which the invention pertains from the following detailed description and drawings, disclosing what is presently contemplated as being the best mode of the invention.

DETAILED DESCRIPTION

Figure 1:
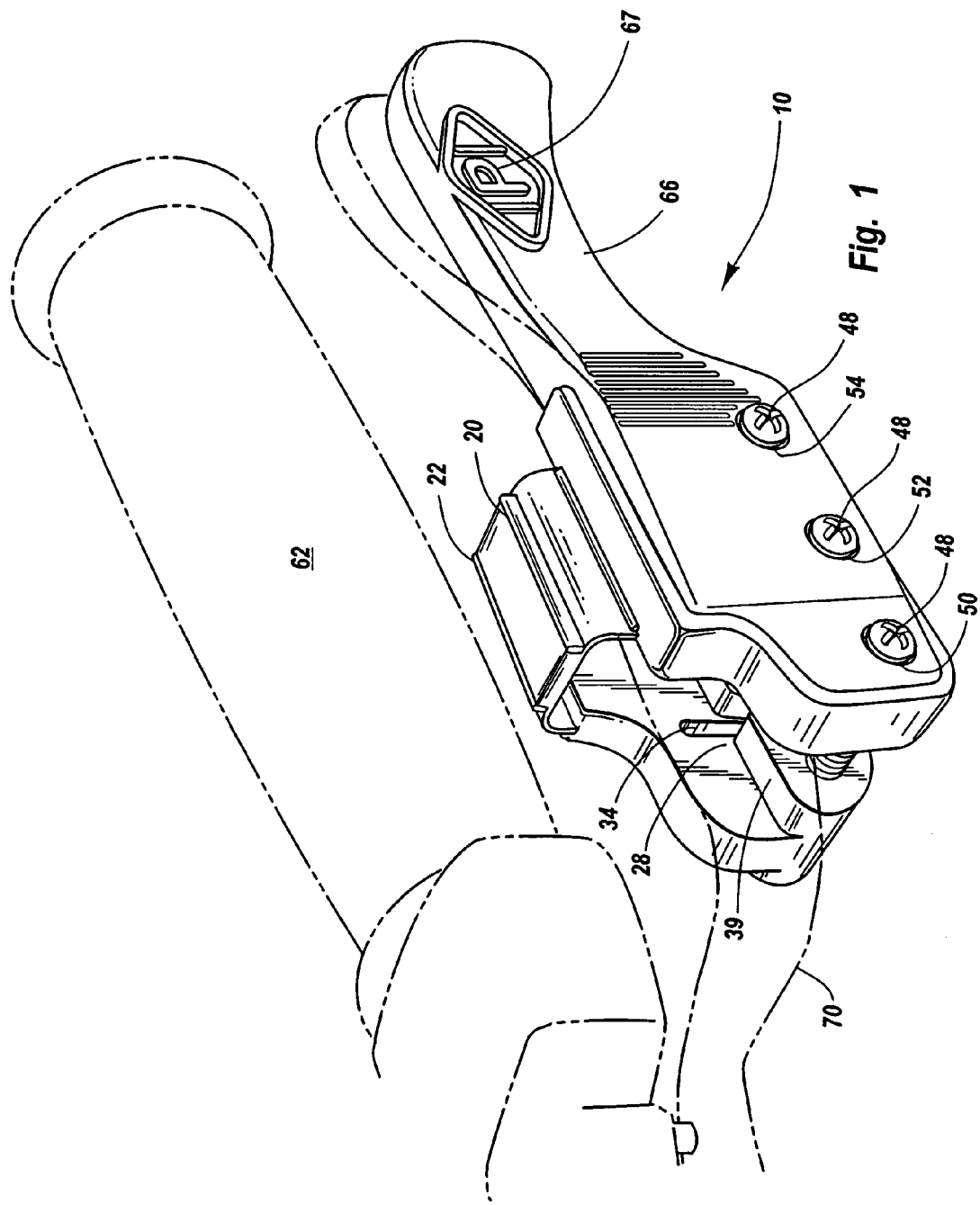
FIG. 1 is perspective view of an adjustable extension lever of the invention secured to a throttle control lever shown on a handlebar of a vehicle and with the throttle control lever and the handlebar grip shown fragmentarily and in phantom.
Figure 2:
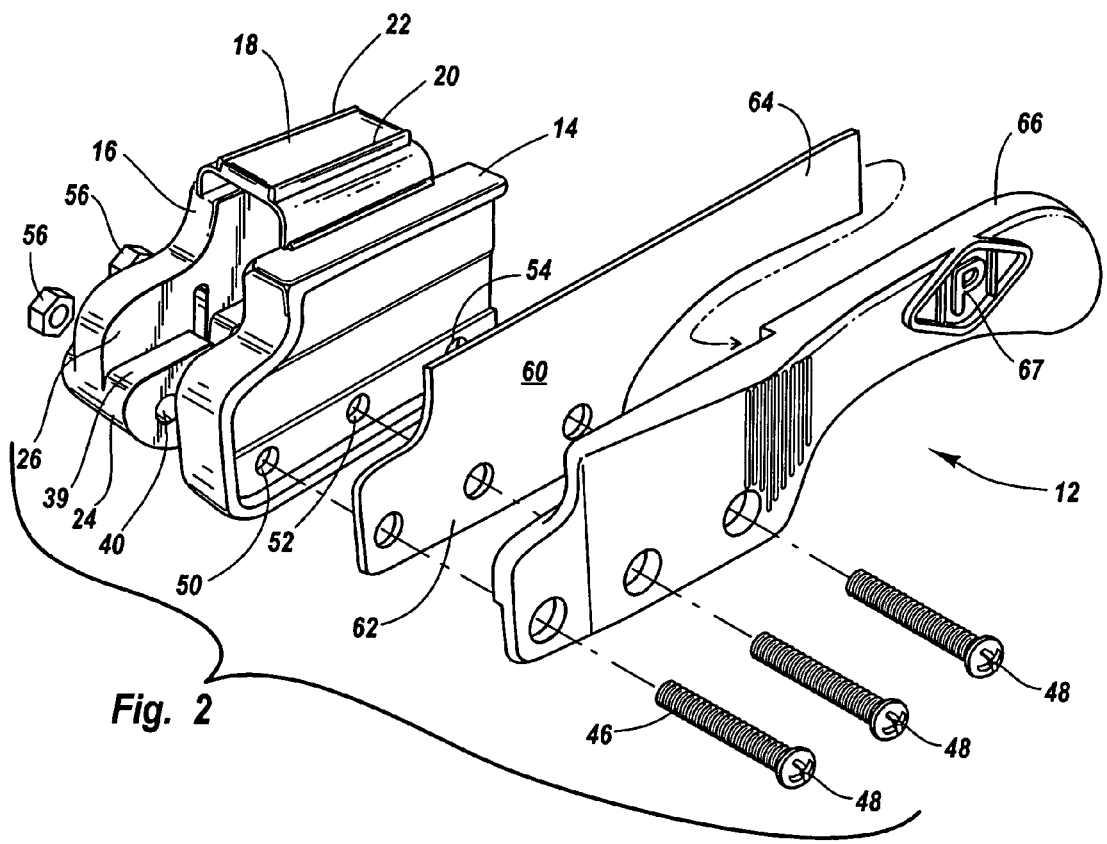
FIG. 2, an exploded perspective view of the adjustable extension lever of the invention, shown with the attachment plates folded along the living hinges for installation on a throttle control lever.
Figure 3:
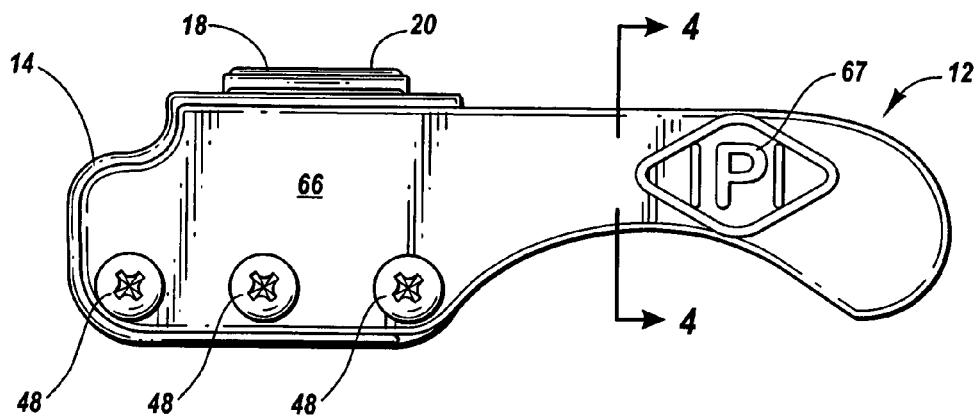
FIG. 3, a side elevation view of one side of the adjustable extension lever, as shown in FIG. 2.
Figure 4:
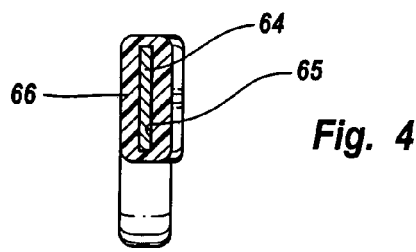
FIG. 4, a vertical section view, taken on the line 4—4 of FIG. 3.

Referring now to the drawings:

In the illustrated preferred embodiment, the adjustable extension lever of the invention is shown generally at 10. Adjustable extension lever 10 has an extender portion, shown generally at 12, that is secured to and projects from a control lever 70 (see FIG. 1) using an attachment means, an attachment portion, or an attachment structure. FIGS. 1–6 illustrates the extender portion 12 secured to and projecting from a first attachment plate 14 and a second attachment plate 16 that is connected to the first attachment plate 14 by a strap 18 having a pair of parallel extending, spaced apart hinges 20 and 22 of the well known kind often referred to as 'living hinges' that extend fully across the strap 18. Second attachment plate 16 has an intermediate portion 24 that is thicker than the strap 18 and a base portion 26 that is thicker than the intermediate portion 24. The second attachment plate 16 also has segments 28, 30 and 32, with slots 34 and 36 separating adjacent segments. The slots 34 and 36 extend from the edge 38 of the second attachment plate 16 through the base portion 26 and into the intermediate portion 24 so that the segments are individually flexible from the intermediate portion 24 to accommodate attachment of the extension lever, as will be further described. A shoulder 39 is formed on each segment between the junction of the base portion 26 and the intermediate portion 24.

Holes 40 are provided through the segments 28, 30 and 32 and the holes are each counter-bored to receive ends 46 of bolts 48 inserted into the holes.

Spaced apart holes 50, 52 and 54 are provided through the first attachment plate 14 and when the adjustable extension lever 10 is folded along the living hinges 20 and 22, the bolts 48 extending through the holes 50, 52 and 54 will extend into the holes 40 of the second attachment plate to be threaded into nuts 56 positioned in the counter-bores of the holes 40.

Extender portion 12 comprises a metal core or first material 60 having a depending flange 62 and a projecting handle 64 and a cover or second material 66.

Cover 66 is molded from a suitably strong, durable material onto the handle 64, the cover 66 is a suitable strong, soft material such as rubber that will give the handle a comfortable feel when engaged by the thumb or hand of a user. A roughened pattern 67 may be provided on the cover 66 to prevent slippage of the thumb or hand of the user from the handle. The cover 66 includes a pocket 65 (see FIG. 4) formed therein that is sized to receive the handle 64.

Extension lever 10 is secured to a projecting control lever 70 (FIG. 1) by folding the extension lever along the living hinges 20 and 22 and then positioning the extension arm over the control lever such that the first and second attachment plates 14 and 16 are on opposite sides of the control lever 60. Bolts 48 are inserted through holes 40 and holes 50, 52 and 54 and are threaded into nuts 56 to clamp the attachment plates securely to the control lever with the handle 64 projecting from the end of the control lever 70. The flexibility of segments 28, 30 and 32 allows the bolts 48 to thread into nuts 56 even if adjustments must be made to the positioning of the attachment plates 14 and 16 in using the extension lever 10 with different kinds and models of vehicles.

As segments 28, 30 and 32 of second attachment plate 16 are pulled toward the first attachment plate 14 by threading of bolts 48 into nuts 56 the portions of shoulder 39 on the segments are moved beneath structure of the control lever to which the extension lever is connected. The shoulder 39 further prevents rotation of the extension lever 10 relative to the control lever 60.

A user wraps the fingers of a hand around a handgrip 62 (FIG. 1) and uses the thumb of the hand to engage the surface 67 and to pull the extension lever 10 and the control lever 60 towards the handgrip 62. The user may then rotate the hand to place the portion of the palm at the base of the thumb against surface 58 to thereby use the palm of the hand to hold the extension lever and attached control lever in a throttle open position. Turning of the palm of the hand against the rubber cover 66 will change the throttle setting of the vehicle and the thumb does not become tired during operation of the vehicle.

Figure 5:
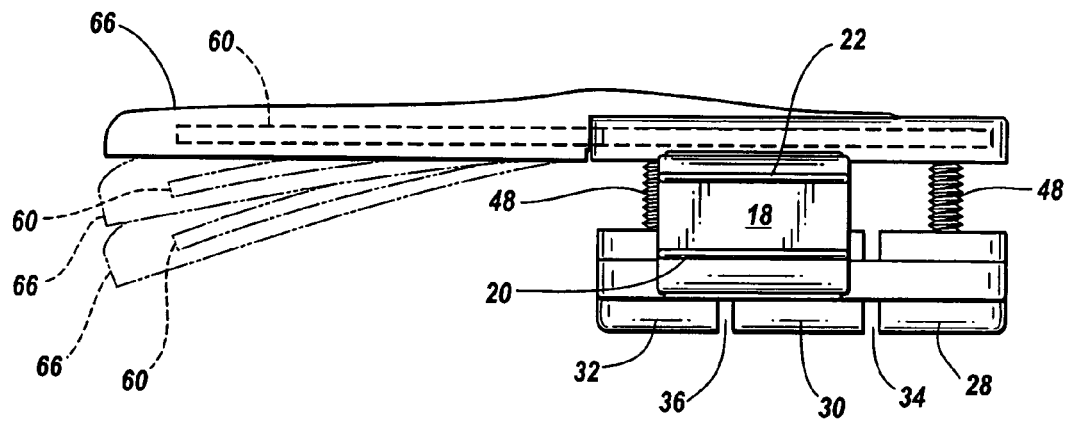
FIG. 5, a top plan view of the extension lever as shown in FIG. 3.
Figure 6:
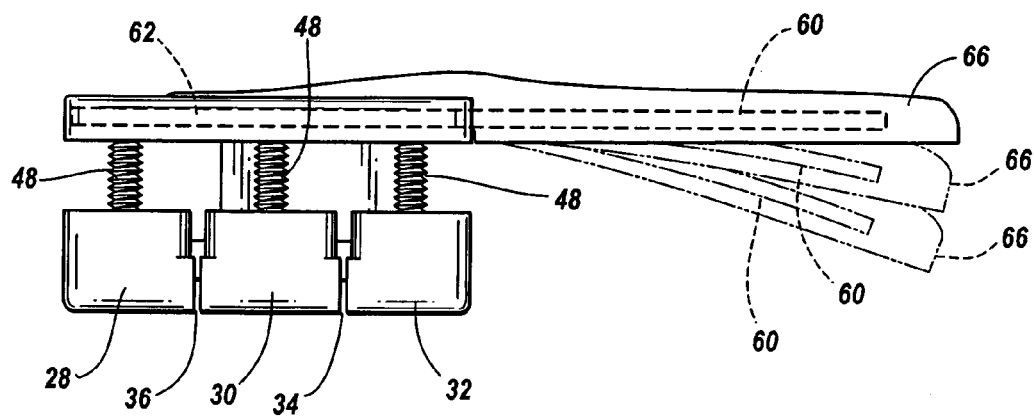
FIG. 6, a bottom plan view.

The metal from which core 60 is formed is bendable and will retain the shape to which it is bent from a first shape to a second, set, or retained shape (see FIGS. 1, 5 and 6) until such time as the force required to bend the core is again applied to again bend the core into a third shape (see FIGS. 5 and 6). The metal selected and the thickness of the core is selected such that a greater force must be applied to the core to bend the handle with respect to the flange than is required to be applied to the extension lever to operate the vehicle control lever to which the extension lever is affixed. Consequently, after the extension lever is affixed to a control lever sufficient force is applied to the handle to bend the handle to a position easily reached by the user of the vehicle. The handle can be re-bent by a similar force application, if desired, to best accommodate another user. Once bent to a desired position a lesser force application to the handle will pivot the control lever to which the extension lever is affixed.

Although a preferred form of my invention has been herein disclosed, it is to be understood that the present disclosure is by way of example and that variations are possible without departing from the subject matter coming within the scope of the following claims, which subject matter we regard as our invention.

We claim:

1. An adjustable extension lever for connection to a control lever of a vehicle having a handlebar comprising
   an extender portion;
   a first attachment plate connected to said extender portion;
   a second attachment plate;
   a strap interconnecting said first and second attachment plates with said extender portion projecting from said first attachment plate, wherein said extender portion is bent in response to a first force application to said extender portion said first force being greater than application of force to said extender application required to operate the control of the vehicle;
   a pair of parallel, spaced apart hinges extending across said strap; and means interconnecting said first and second attachment plates for clamping said plates toward one another.

2. An extension lever as in claim 1, wherein the extender portion has a metal core.

3. An extension lever as in claim 2, wherein at least part of the core of the extender portion extends into and is covered with a rubber material.

4. An extension lever as in claim 3, wherein the extender has a non-skid engagement surface portion.

* * * * *